Dec. 16, 1958 F. G. NICOLAUS 2,864,260
RATCHET MECHANISM WITH INERTIA BRAKE
Filed June 10, 1957 2 Sheets-Sheet 1
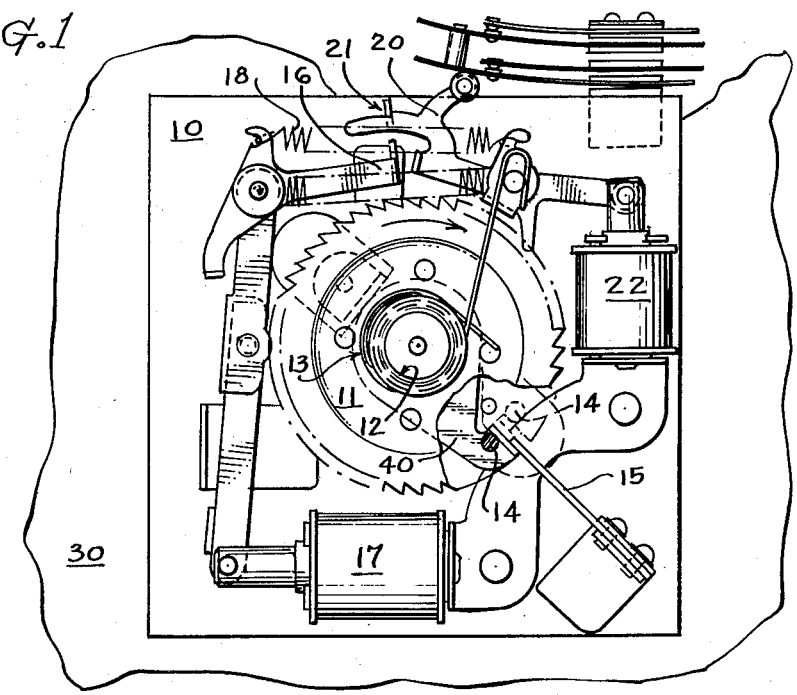
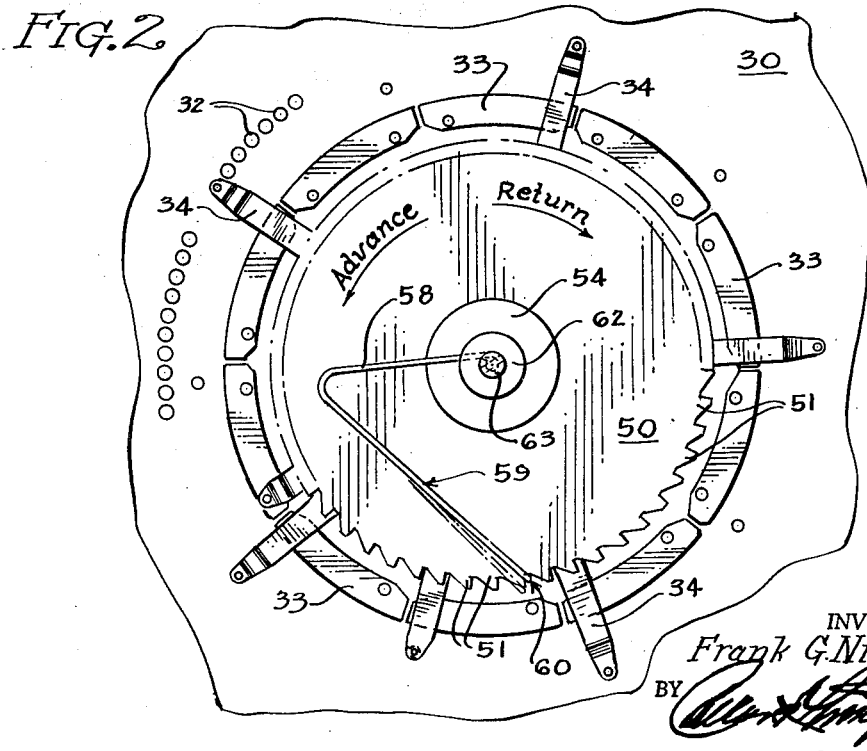
INVENTOR.
Frank G. Nicolaus
BY
Attorney Dec. 16, 1958 F. G. NICOLAUS 2,864,260
RATCHET MECHANISM WITH INERTIA BRAKE
Filed June 10, 1957 2 Sheets-Sheet 2
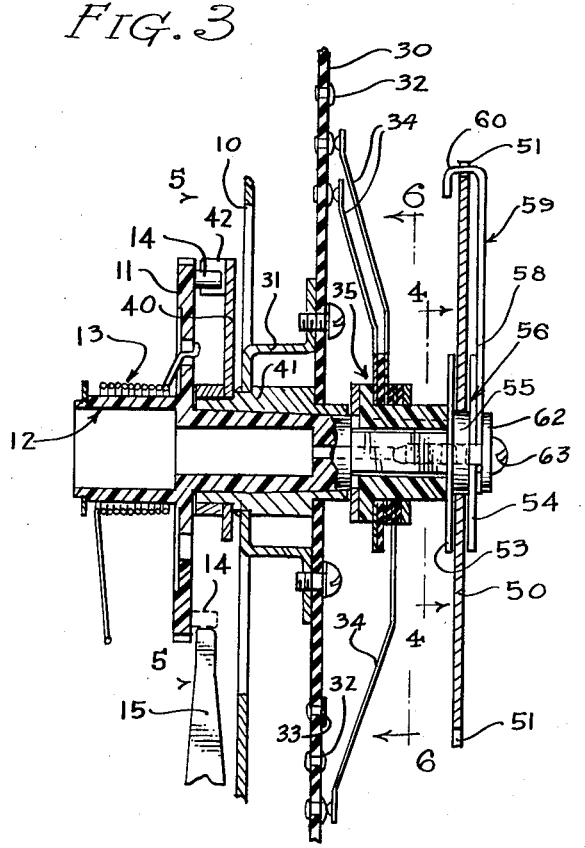
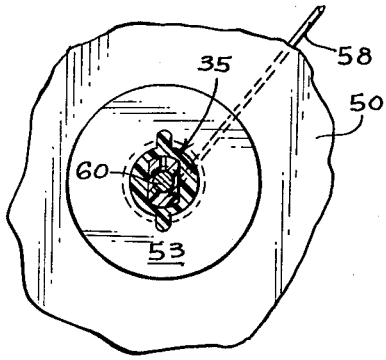
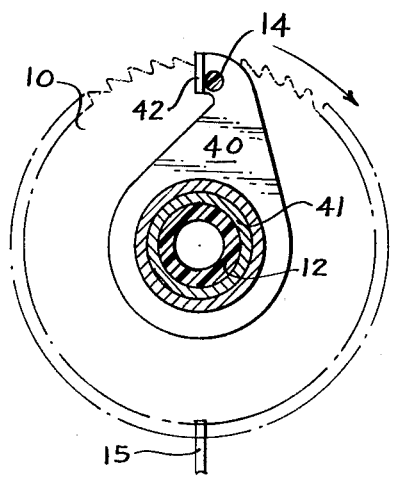
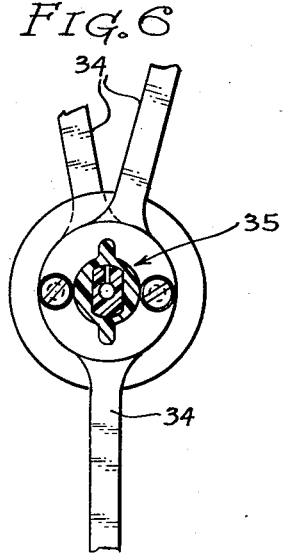
INVENTOR.
Frank G. Nicolaus
BY
Attorney

United States Patent Office 2,864,260
Patented Dec. 16, 1958

2,864,260

RATCHET MECHANISM WITH INERTIA BRAKE

Frank G. Nicolaus, Chicago, Ill.; American National Bank and Trust Company of Chicago, executor of the estate of Raymond T. Moloney, deceased Application June 10, 1957, Serial No. 664,738

2 Claims. (Cl. 74—142)

The disclosure relates to inertia braking and energy-absorbing devices used in conjunction with a stepping switch.

The principal object of the invention is the provision of means for extending the range of rotary travel of a certain type of stepping switch beyond one revolution, and absorbing the shock of sudden stoppage at a home position arising from reverse homing travel of the stepping ratchet system by a return spring which is strong enough to carry the ratchet system back through more than one revolution.

It is a further object to provide a simple inertia-relief device for a stepping switch which will not unduly load the advancing or returning drive means nor add objectionably to the cost of such a device.

Additional objects and aspects of novelty and utility relate to details of the construction and operation of the preferred embodiment described hereinafter in view of the annexed drawings, in which:

Fig. 1 is an elevational view of a stepping-switch ratchet mechanism;

Fig. 2 is a fragmentary elevation of a contact panel and novel inertia means on the obverse side of the unit of Fig. 1;

Fig. 3 is a vertical sectional detail through the device of Fig. 1;

Fig. 4 is a fragmentary vertical sectional detail through part of the main ratchet spindle with parts of the inertia means seen in elevation, looking in the direction of lines 4—4 of Fig. 3;

Fig. 5 is a section along lines 5—5 of Fig. 3 showing the over-travel stop arm in elevation;

Fig. 6 is a sectional detail taken along lines 6—6 of Fig. 3 showing parts of the switch wipers and hub in elevation.

The step switch shown in Fig. 1 is of the type described in part in my copending applications Serial Nos. 581,522 and 601,079, and insofar as the construction relates to the present improvements, comprises a base plate 10 upon which is journalled a ratchet wheel 11 normally urged by a coil spring 13 (Fig. 3 also) carried on a hub structure 12 which is part of the ratchet assembly, into a starting or home position which is determined by a special stop means including a somewhat yieldable stop arm 15, fixed on the base plate, and certain over-travel means to be described hereinafter.

The ratchet wheel is intended to be advanced step-by-step by action of an advancing pawl 16 oscillated by electromechanical actuating means including the solenoid 17 and spring 18.

The gain of the ratchet wheel is held by a holding pawl 20 which is normally engaged in the ratchet teeth except when it is locked in released condition, as shown in Fig. 1, by an interlock means on the advancing pawl cooperable with complementary interlock means on the holding pawl and indicated generally at 21.

The holding pawl will be withdrawn from the ratchet teeth and elevated by energization of a reset solenoid 22 which, like the stepping solenoid 17, is to be connected to some desired control circuit (not shown), and upon such elevation, the aforesaid interlocking action automatically takes place as a result of the simultaneous elevation of the two pawls.

With the two pawls 16 and 20 thus interlocked in raised or released condition, the ratchet wheel is free to be turned back to starting position by the normal spring 13, and ordinarily, such return movement of the wheel would be arrested by impingement of a stopping stud 14 on the ratchet wheel with the end region of the heavy spring stop arm 15.

Commonly, the ratchet wheel is loaded by rotary switch means, such as shown in Figs. 2 and 3, which may consist of an insulated panel 30 carried on an integral spider 31 which is on plate 10 on the side thereof opposite from the ratchet drive means.

A large number of contact members 32 and 33 are carried on this panel to be variously engaged by spring wiper fingers 34 carried by a hub fitting 35 fast on the ratchet spindle, for example, as shown in Fig. 6.

Accordingly, the ratchet wheel is loaded during both its advancing and returning travel, and by reason of the fact that it is electrically and economically desirable to keep the solenoid 17 and its current drain as small as possible consistent with reliable stepping action, the return spring means 13 is made as weak as possible consistently with positive restorative action, and the ratchet disc itself, as well as its spindle and hub parts, are likewise made as light in weight as feasible.

Up to this point, the foregoing description, so far as the present disclosures and improvements are concerned, pertains to matter which is wholly environmental to the invention claimed in this application.

It has proved necessary to contrive stepping switches of the class described so that the ratchet wheels are capable of making more than one revolution and a special over-travel stop means has been devised to render the stop stud 14 and stop arm 15 ineffective at the conclusion of the first full revolution of the ratchet wheel.

Such an over-travel stop means comprises, as seen in Fig. 5, a rotary stop arm 40 which floats on the main journal 41 on plate 10. The over-travel arm has at its end a lug 42 positioned to be engaged by the stop lug 14 on the ratchet wheel.

The length of the spring stop arm 15 is shortened so that the ratchet stud 14 misses it, as in the dotted-line position, Fig. 3, and in this manner the ratchet wheel is permitted to continue its advance past the stop arm after completing the first revolution.

But upon passing the stop arm 15, stud 14 will engage the over-travel lug 42 on the floating stop and begin to carry the latter around with it during the second revolution, until this lug strikes the end of the stop arm 15, thus finally arresting the advance of the ratchet wheel.

Upon release-actuation of the holding pawl 20, as aforesaid, the ratchet wheel will be spring-driven back to home position, and in this action the stud 14 will carry the over-travel arm 40 back with it until the lug 42 thereon strikes the opposite side of the stop arm 15. The second "revolution" of the ratchet wheel in the construction shown is not quite a full 360° because of the thickness of the stud 14 and lug 42.

An analogous over-travel and floating stop means is shown in U. S. Patent No. 2,618,719 (Durant), inclusive of the prior art referred to therein.

Despite efforts to adjust the loading weights of the ratchet and switch means and the rate of the return spring 13 for optimum efficiency and minimum shock both in advancing and returning movements, a problem arises in connection with the multi-revolution type of construction that an appreciably greater momentum is built up in the moving ratchet wheel system than is the case with the single-revolution type.

The stop arm 15, in accordance with prior disclosures, has been especially shaped and designed to afford a maximum braking yieldability, on the one hand, and sufficient strength, on the other, to prevent crystallization and rupture of the metal. Moreover, in one form of construction the ratchet wheel 10 and its stop pin 14 are integrally formed of nylon and the pin will withstand a good deal of shock.

Nevertheless, the energy stored in the moving ratchet wheel system in return action is such as to cause damage to the stop pins 14.

The present disclosure relates to the provision of means for dissipating the excess energy of momentum after the ratchet wheel has turned fully home to starting position, this means including, as depicted in Figs. 2 and 3, an inertia member in the form of a second ratchet disc 50 and means mounting the same to float on the main ratchet spindle.

As viewed in Fig. 3, the aforesaid floating mount for the inertia wheel comprises a pair of washers 53 and 54 having clamped therebetween a bearing washer 55 which is thicker by several thousandths of an inch than the inertia wheel 50, the latter having a slightly over-sized concentric hole at 56 to fit freely over the bearing washer so that the inertia wheel can spin easily on washer 55 between the two clamping washers 53, 54.

A spring presser arm 58, Figs. 2, 3, 4, is clamped between the outside clamp washer 54 and a retaining washer 62, which in turn is tightened against the spring arm by means such as the retaining screw 63 threaded into the spindle of the main ratchet wheel assembly.

The presser spring has a reverse extension 59, the free end of which is laterally offset to form a hook-shaped pawl portion 60 (Fig. 3) which is prevented from escaping the teeth 51 by the hooked part.

The spring arm means 58, 59, 60 is relatively stationary to the inertia disc, that is to say, when the main stepping ratchet 11 turns in either direction the arm 58 is carried along with it, and while the inertia ratchet wheel 50 can be turned independently, the springy pawl means 60 exerts sufficient pressure on the teeth of ratchet disc 50 to carry the latter with the main ratchet in the advancing movements of the latter, although the pitch of the teeth 51 is away from advancing (counterclockwise) direction in Fig. 2, since the only loading on disc 50 is its own mass.

The action of the inertia means is such that when the main ratchet disc 11 is spring-driven back to home position the disc 50 is carried back with it, owing to the hook-pawl 60 engaging against the pitch of teeth 51, and accordingly energy is stored in disc 50 which is made of metal and as heavy as possible without adding objectionably to the loading of the main ratchet system.

When the main ratchet wheel is abruptly stopped at home position by action of the over-travel stop means 14—15—42, a substantial portion of the shock is relieved through reaction in the inertia ratchet 50, which now starts to spin (clockwise, Fig. 2) with the pawl 60 slipping over the teeth, or more properly with the teeth 51 slipping beneath the now-stationary pawl means 60, since the main ratchet wheel is now at rest.

By this means the ordinary single-revolution range of the stepper is extended without adding objectionably to the loading or cost of the device.

I claim:

1. In an extended-range ratchet-stepping mechanism having step-up means for advancing a stepping ratchet wheel from a starting position through more than one revolution of travel, and spring means operable to return the wheel against a stop at said starting position from any advanced position, improvements comprising, to wit: inertia means for absorbing energy stored in the spring-returned travel of the ratchet wheel upon impact with said stop means comprising a second ratchet wheel floating upon the rotative spindle of the stepping ratchet wheel, and a spring presser arm secured to move with said spindle and having a pawl portion riding in the teeth of said second ratchet wheel, said teeth being pitched to be positively carried by said presser arm in return travel of the stepping ratchet, and to slip relative to said arm when the latter is stopped with said spindle, and the second wheel tends to continue in the return direction by inertia energy derived from return travel with the ratchet wheel stepping through action of said presser arm.

2. In a stepping switch including a spindle to be advanced from a starting position and spring means for driving the spindle back to starting position against a stop determining said position, inertia means for absorbing excess energy in stopping of the spindle as aforesaid, said means comprising: a ratchet disc floating on said spindle and having teeth pitched away from the direction of returning movement of the spindle, and a spring arm fixed to turn with the spindle and having a pawl portion riding in said teeth with sufficient pressure to carry the ratchet disc with it in both directions of travel and to permit the ratchet teeth to slip past the pawl portion when the spindle comes to rest at said stopping position and the disc tends to continue return movement by reason of energy stored therein in returning movement.

References Cited in the file of this patent

UNITED STATES PATENTS

| | | |
|---|---|---|
| 2,180,539 | Miller | Nov. 21, 1939 |
| 2,428,569 | Hunt | Oct. 7, 1947 |
| 2,540,854 | Woestemeyer | Feb. 6, 1951 |